A. YOUNGREN & H. L. LIND.
POTATO PLANTER.
APPLICATION FILED APR. 28, 1916.
1,218,919.
Patented Mar. 13, 1917.
3 SHEETS—SHEET 3.
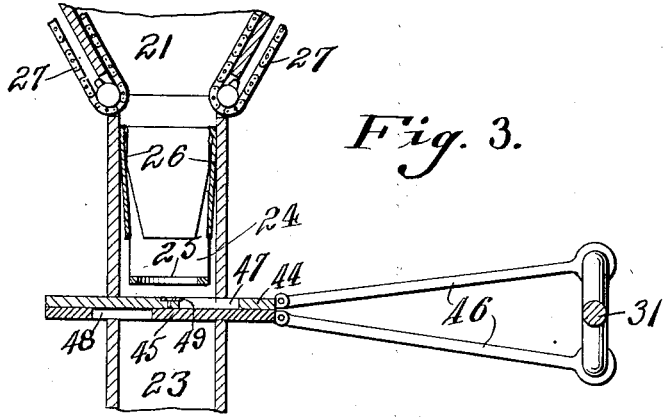
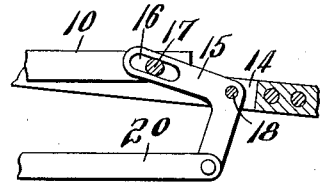
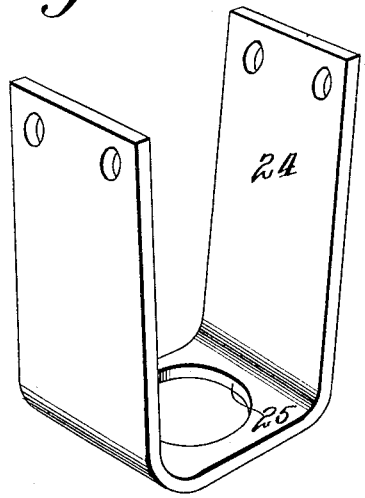
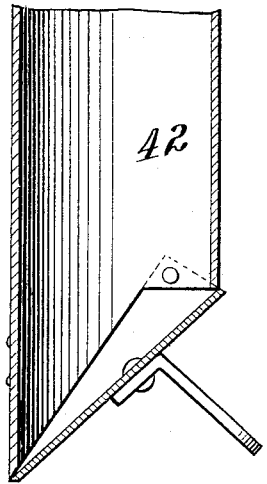
WITNESSES
Roland T. Williams.
Ross J. Woodward.
INVENTOR
Alfred Youngren
Henry L. Lind
BY Richard Owen.
ATTORNEY
THE NORRIS PETERS CO., PHOTO-LITHO., WASHINGTON, D. C.

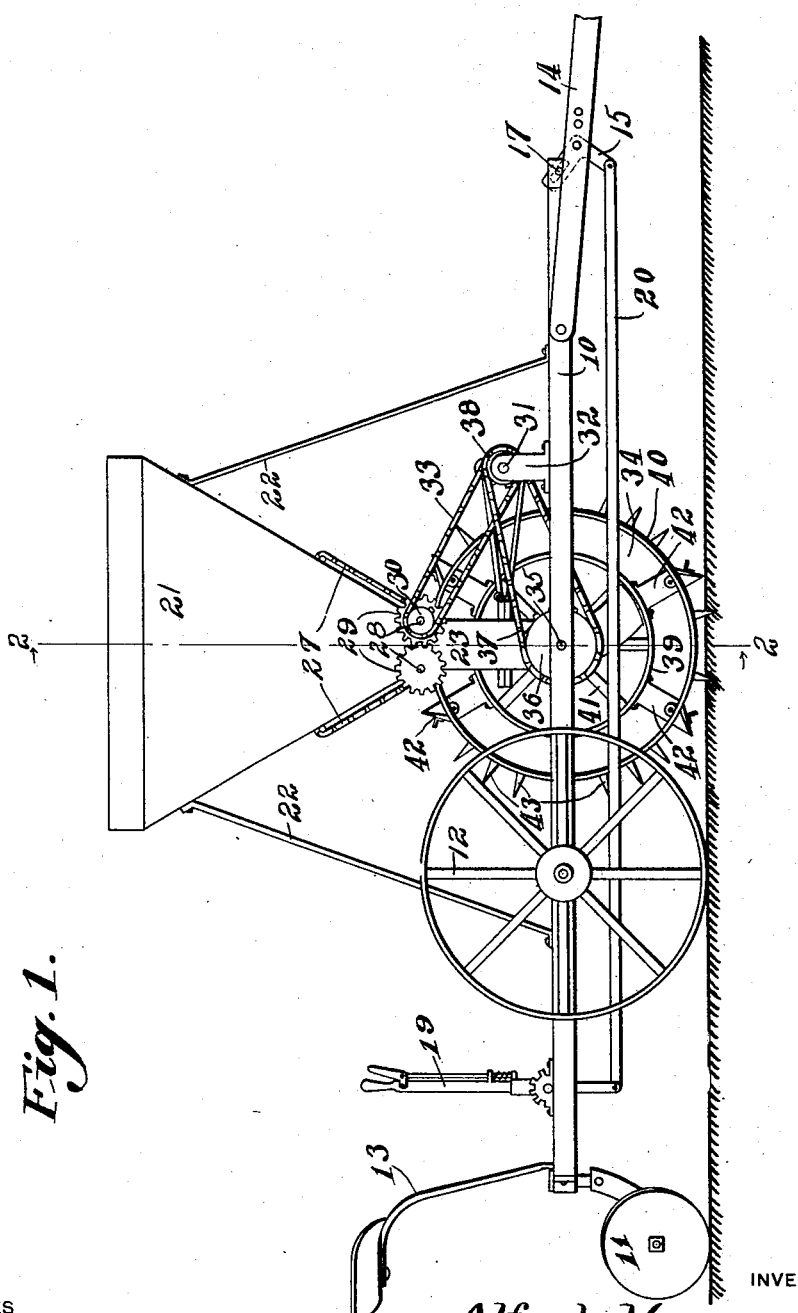

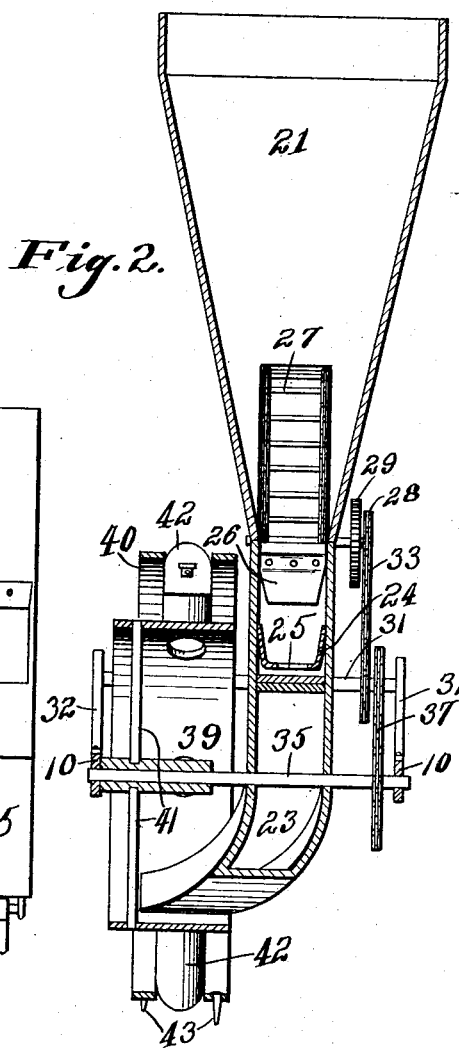

UNITED STATES PATENT OFFICE.

ALFRED YOUNGREN AND HENRY L. LIND, OF BARNUM, MINNESOTA.

POTATO-PLANTER.

1,218,919.  Specification of Letters Patent.  Patented Mar. 13, 1917.

Application filed April 28, 1916. Serial No. 94,168.

*To all whom it may concern:*

Be it known that we, ALFRED YOUNGREN and HENRY L. LIND, citizens of the United States, residing at Barnum, in the county of Carlton and State of Minnesota, have invented certain new and useful Improvements in Potato-Planters, of which the following is a specification.

This invention relates to an improved potato planting machine and the principal object of the invention is to provide a potato planter having an improved type of potato holding hopper and feeding mechanism for carrying the potatoes into the outlet spout of the hopper and to further provide improved cutting means in the outlet spout for cutting the potatoes into pieces.

Another object of the invention is to provide an improved type of planting wheel having spouts connected therewith and communicating with an inner rim with which the spout communicates so that the cut potatoes will pass into the cutting spouts of the planting wheel.

Another object of the invention is to so construct this potato planter that the conveyers of the spouts and the cutting knives may be operated from a crank shaft rotated through the medium of a sprocket chain leading around a sprocket wheel carried by the axle of the planting wheel.

Another object of the invention is to provide an improved type of frame for the planter so constructed that the depth to which the digging wheel enters the ground may be regulated.

This invention is illustrated in the accompanying drawings, wherein:—

Figure 1 is a view showing the improved potato planter in side elevation.

Fig. 2 is a vertical sectional view taken along the lines 2—2 of Fig. 1.

Fig. 3 is an enlarged sectional view showing the manner of mounting the cutting means.

Fig. 4 is a top plan view of the cutting means in one position.

Fig. 5 is a view similar to Fig. 4 showing the cutting means in an adjusted position.

Fig. 6 is a longitudinal sectional view through the upper section of the cutting mechanism.

Fig. 7 is a fragmentary sectional view showing the manner of mounting the adjusting means for the frame.

Fig. 8 is a perspective view of the yoke through which the potatoes pass.

Fig. 9 is a sectional view through one of the planting spouts of the planting wheel.

The frame 10 of this machine is supported by the caster 11 and wheels 12 and carries the driver's seat 13 and pivotally mounted side bars 14 which will lead to the draft appliance and may be called the auxiliary frame. This auxiliary frame carries a bell crank lever 15 which has its upper arm provided with a slot 16 in which there is mounted the pin 17 so that when the bell crank lever is moved upon its pivot 18, through the medium of the latch lever 19 and draw bar 20, the frame 10 will be raised or lowered and thus moved to the desired adjusted position according to the depth at which it is desired to have the planting wheel dig into the ground.

The hopper 21 is supported by the bracing bars 22 and is provided with an outlet neck 23 in which there is positioned a yoke 24 having a passageway 25 formed therein. Spring arms 26 are secured in this outlet spout 23 above the yoke 24 as shown in Fig. 3 so that the potatoes passing through this spout will be held in the proper position for passing through the passageway 25. Endless conveyer chains 27 pass through the lower portion of this hopper for feeding the potatoes down into the spout 23 and have their lower shafts 28 provided with gears 29 so that when the machine is in operation rotary movement of the shaft which carries the sprocket wheel 30 will be transmitted to the second shaft.

A crank shaft 31 is rotatably supported above the frame 10 by means of bearing brackets 32 and carries a sprocket wheel around which passes the sprocket chain 33. This sprocket chain 33 also passes around the sprocket wheel 30 and therefore when the crank shaft is rotating the endless conveyers will be moved. The planting wheel indicated in general by the numeral 34 is provided with an axle 35 which carries a sprocket wheel 36 around which passes a sprocket chain 37 which sprocket chain also passes around a sprocket wheel 38 carried by the crank shaft 31. Therefore when the machine is in motion, rotary movement will be transmitted to the crank shaft 31 and from the crank shaft to the conveyers.

The planting wheel is provided with inner and outer rims 39 and 40, the inner rim being connected with the axle 35 by means of spokes 41 and the outer rim being connected with the spouts or chutes 42 which in their turn are connected with the inner rim. These spouts or planting chutes 42 are open ended and are so positioned that as the cutting wheel rotates, these spouts will register with the outlet spouts 23 thus permitting the cut potatoes to pass through the planting spouts. Spikes 43 are provided for the outer rim so that the planting wheel may obtain a firm grip upon the ground thus rotating the planting wheel as the machine is drawn across the field.

The cutting mechanism comprises boards 44 and 45 which are slidably mounted in an opening extending transversely through the spout 23 beneath the yoke 24 and are connected with the crankshaft 31 by means of the links or actuating rods 46. Therefore as the crank shaft rotates, these boards 44 and 45 will reciprocate through the spout 23. The boards are provided with openings 47 and 48 and the board 44 carries a knife 49 which will cut the potato extending through the opening 25 as the boards move This cut piece of potato will pass through the openings 47 and 48 when they register and will drop down through the spout to the planting wheel. This operation is continued with the endless conveyers feeding the potatoes down into the spout 23 and the cutting knives then cutting the potatoes into pieces which will drop through the spout and into the planting chutes or spouts of the planting wheel as this wheel rotates. It will thus be seen that the planting wheel not only serves as a planting mechanism but also serves as means for driving the cutting means and endless conveyers through the medium of the shaft 31. It will be further noted that when it is desired to move the machine without the conveyers and knives operating the frame 10 may be raised through actuation of the latch lever 19 and the planting wheel thus moved out of engagement with the ground. The machine is thus very convenient for use as it can be vertically adjusted both for the depth it will cut into the ground and in order to render the cutting and feeding means inoperative.

What is claimed is:—

1. A potato planting machine comprising a supporting frame, a hopper supported above said frame and provided with an outlet spout, a planting wheel rotatably connected with said frame and provided with an outer ground engaging rim and inner rim, planting chutes leading from said inner rim through the outer rim, the spout of said hopper engaging said inner rim for registering with the planting chutes as said planting wheel rotates, a driven shaft carried by said frame, cutting means actuated from said driven shaft for cutting potatoes passing through said spout, feeding means operatively connected with said hopper for feeding potatoes into said spouts, and means for transmitting rotary movement of said planting wheel to said driven shaft.

2. A potato planting machine comprising a supporting frame, a hopper provided with an outlet spout, a planting wheel rotatably connected with said frame and provided with inner and outer rims, planting chutes leading from said inner rim through the outer rim, the spout of said hopper engaging said inner rim for registering with the planting chutes as said planting wheel rotates, ground engaging teeth carried by the outer rim, cutting means for cutting potatoes passing through said spout, and feeding means operatively connected with said hopper for feeding potatoes into said spout.

In testimony whereof we affix our signatures in presence of two witnesses.

ALFRED YOUNGER.
HENRY L. LIND.

Witnesses:
 ALBERT PETERSON,
 ANDREW PETERSON.

Copies of this patent may be obtained for five cents each, by addressing the "Commissioner of Patents. Washington, D. C."